US012676713B2

(12) United States Patent
Zhou et al.

(10) Patent No.: US 12,676,713 B2
(45) Date of Patent: Jul. 7, 2026

(54) REFERENCE SIGNAL TRANSMISSION METHOD AND RELATED DEVICE

(71) Applicant: Huawei Technologies Co., Ltd., Shenzhen (CN)

(72) Inventors: Han Zhou, Shanghai (CN); Xiaolei Tie, Shanghai (CN); Zhanzhan Zhang, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 680 days.

(21) Appl. No.: 17/889,730

(22) Filed: Aug. 17, 2022

(65) Prior Publication Data

US 2022/0399973 A1     Dec. 15, 2022

Related U.S. Application Data

(63) Continuation of application No. PCT/CN2020/075773, filed on Feb. 18, 2020.

(51) Int. Cl.
*H04L 5/00*        (2006.01)
*H04W 72/23*      (2023.01)

(52) U.S. Cl.
CPC ........... *H04L 5/0048* (2013.01); *H04W 72/23* (2023.01)

(58) Field of Classification Search
CPC .................................................. H04L 5/0048
See application file for complete search history.

(56) References Cited

U.S. PATENT DOCUMENTS

| | | | |
|---|---|---|---|
| 7,873,018 B2 * | 1/2011 | Kakani | ............... H04W 72/535 370/329 |
| 10,333,672 B2 | 6/2019 | Nagaraja et al. | |
| 2008/0267165 A1 | 10/2008 | Bertrand et al. | |
| 2018/0262313 A1 * | 9/2018 | Nam | ..................... H04L 5/0044 |
| 2019/0222390 A1 | 7/2019 | Su et al. | |

(Continued)

FOREIGN PATENT DOCUMENTS

| | | |
|---|---|---|
| CN | 104756537 A | 7/2015 |
| CN | 109479204 A | 3/2019 |

(Continued)

OTHER PUBLICATIONS

Alternate machine English translation for CN104756537A (Year: 2015).*

(Continued)

*Primary Examiner* — James P Duffy
(74) *Attorney, Agent, or Firm* — Slater Matsil, LLP

(57)        ABSTRACT

A reference signal transmission method is provided to reduce power consumption. The method may be applied to time-frequency tracking. The method includes a network device sends configuration information of a reference signal RS to a terminal device, where the configuration information is used to indicate at least one periodic target sending time period of the RS; and the network device sends the RS in a first target sending time period based on a first periodicity, where the first target sending time period belongs to the at least one periodic target sending time period. In this case, the RS is sent only in a part of the target sending time period, that is, the RS is not an always-on signal, and wake-up duration of UE is short. This helps UE reduce power consumption.

17 Claims, 9 Drawing Sheets

(56)     References Cited

U.S. PATENT DOCUMENTS

| | | | |
|---|---|---|---|
| 2019/0273546 A1 | 9/2019 | Onggosanusi et al. | |
| 2021/0167911 A1 | 6/2021 | Kiao et al. | |
| 2021/0227496 A1* | 7/2021 | Ly ........................ | H04W 76/27 |

FOREIGN PATENT DOCUMENTS

| | | | |
|---|---|---|---|
| CN | 110391882 A | 10/2019 | |
| CN | 110557234 A | 12/2019 | |
| CN | 110690947 A | 1/2020 | |
| WO | 2018058389 A1 | 4/2018 | |

OTHER PUBLICATIONS

"3rd Generation Partnersip Project; Technical Specification Group Radio Access Network; NR; Multiplexing and Channel Coding (Release 15)," 3GPP TS 38.212, V0.0.0, May 2017, 10 pages.
"3rd Generation Partnership Project; Technical Specification Group Radio Access Network; NR; Physical layer procedures for control (Release 15)," 3GPP TS 38.213 V1.0.0, Sep. 2017, 16 pages.
"3rd Generation Partnership Project; Technical Specification Group Radio Access Network; NR; Physical layer procedures for data (Release 15)," 3GPP TS 38.214 V1.0.0, Sep. 2017, 32 pages.
"3rd Generation Partnership Project; Technical Specification Group Radio Access Network; NR; Radio Resource Control (RRC); Protocol specification (Release 15)," 3GPP TS 38.331 V0.1.0 , Oct. 2017, 42 pages.

* cited by examiner

Terminal device

Terminal device

Network device

Terminal device

REFERENCE SIGNAL TRANSMISSION METHOD AND RELATED DEVICE

CROSS-REFERENCE TO RELATED APPLICATIONS

This application is a continuation of International Application No. PCT/CN2020/075773, filed on Feb. 18, 2020, the disclosure of which is hereby incorporated by reference in its entirety.

TECHNICAL FIELD

The present disclosure relates to the field of communication technologies, and in particular, to a reference signal transmission method and a related device.

BACKGROUND

In a long term evolution (LTE) system, a base station can periodically send a cell-specific reference signal (CRS), which is also referred to as a common reference signal (CRS). User equipment (UE) keeps synchronized with the base station in terms of time and frequency by tracking the CRS. States of the UE may include a connected state and a non-connected state, and the non-connected state may include an idle state and an inactive state.

There is no CRS in a new radio (NR) system of a 5th generation mobile communication technology (5G), and a time-frequency tracking signal (Channel State Information reference signal for tracking, TRS) and a synchronization signal block (SSB) are introduced. The UE receives a TRS in the connected state and receives an SSB in the non-connected state.

A third Generation Partnership Project (3GPP) protocol stipulates that, for UE in a non-connected state, it can be assumed only that a sending periodicity of an SSB is 20 ms. Corresponding wake-up duration of the UE is long. Consequently, power consumption overheads of the UE are large.

SUMMARY

Embodiments of this application provide a reference signal transmission method and a related device, to reduce power consumption.

A first aspect of embodiments of this application provides a reference signal transmission method. The method includes: A network device sends configuration information of a reference signal RS to a terminal device, where the configuration information is used to indicate at least one periodic target sending time period of the RS; and the network device sends the RS in a first target sending time period based on a first periodicity, where the first target sending time period belongs to the at least one periodic target sending time period.

In this embodiment of this application, the network device sends the configuration information of the reference signal RS to the terminal device, and sends the RS in the first target sending time period based on the first periodicity by configuring the target sending time period, where the target sending time period includes the first target sending time period. In this case, the RS is sent only in a part of the target sending time period, that is, the RS is not an always-on signal, and wake-up duration of the UE is short. This helps UE reduce power consumption.

Optionally, in a possible implementation of the first aspect, the foregoing step further includes: The network device determines a first paging occasion PO. That the network device sends the RS in a first target sending time period based on a first periodicity includes: The network device sends the RS in at least one slot of the first target sending time period based on the first periodicity. The at least one slot is a slot included in the first PO, or the at least one slot is a slot included in the first PO and one or more slots before the slot included in the first PO.

In this possible implementation, the network device sends the RS in the slot included in the first PO, or in the slot included in the first PO and the one or more slots before the slot included in the first PO. This helps improve efficiency of receiving the RS by the terminal device.

Optionally, in a possible implementation of the first aspect, the foregoing step further includes: The network device determines a second PO, where the second PO is in first duration at the beginning of the first target sending time period; and the network device sends first indication information to the terminal device in the second PO, where the first indication information indicates that the network device sends the RS in the first target sending time period.

In this possible implementation, the network device sends the first indication information, to indicate that the terminal device receives the RS in the target time period including the second PO. This improves receiving efficiency.

Optionally, in a possible implementation of the first aspect, the foregoing step further includes: determining a third PO, where the third PO is in second duration before the first target sending time period; and sending second indication information to the terminal device in the third PO, where the second indication information indicates that the network device sends the RS in the first target sending time period.

In this possible implementation, the network device sends the second indication information, to indicate that the terminal device receives the RS in the target time period after the third PO. This improves receiving efficiency.

Optionally, in a possible implementation of the first aspect, in the foregoing step, the configuration information is further used to indicate a first time point and a second time point in the first target sending time period. That the network device sends the RS in a first target sending time period based on a first periodicity includes: The network device sends the RS between the first time point and the second time point based on the first periodicity.

In this possible implementation, it is further limited that the network device sends the RS between the first time point and the second time point based on the first periodicity, and notifies the terminal device of the first time point and the second time point by using the configuration information. This improves receiving efficiency.

Optionally, in a possible implementation of the first aspect, in the foregoing step, the RS is a CSI-RS or a TRS.

In this possible implementation, the RS is specifically limited. This improves implementability of the solution.

A second aspect of embodiments of this application provides a reference signal transmission method. The method includes: A terminal device receives configuration information of a reference signal RS from a network device, where the configuration information is used to indicate at least one periodic target sending time period of the RS; the terminal device determines whether the network device sends the RS in a target sending time period; and the terminal device receives the RS if the network device sends the RS in the target sending time period.

In this embodiment of this application, the terminal device receives the configuration information of the reference signal RS, the terminal device determines whether the network device sends the RS in the target sending time period, and the terminal device receives the RS if the network device sends the RS in the target sending time period. In this case, the RS is received only in a part of the target sending time period, that is, the RS is not an always-on signal, and wake-up duration of the UE is short. This helps UE reduce power consumption.

Optionally, in a possible implementation of the second aspect, the foregoing step further includes: The terminal device determines a first paging occasion PO. The receiving the RS includes: attempting to receive the RS in at least one slot of the target sending time period, where the at least one slot is a slot included in the first PO, or the at least one slot is a slot included in the first PO and one or more slots before the slot included in the first PO.

In this possible implementation, the terminal device attempts to receive the RS only in the slot of the first PO and the one or more slots before the slot included in the first PO. This improves receiving efficiency in comparison with an attempt to receive the RS within a full periodicity.

Optionally, in a possible implementation of the second aspect, in the foregoing step, that the terminal device determines whether the network device sends the RS in a target sending time period includes: The terminal device receives a target signal based on the configuration information that is of the reference signal RS and that is sent by the network device; the terminal device calculates received signal quality of the target signal; and the terminal device determines whether the received signal quality of the target signal meets a preset condition. The method further includes: if the received signal quality meets the preset condition, determining that the network device sends the RS in the target sending time period; or if the received signal quality does not meet the preset condition, determining that the network device does not send the RS in the target sending time period.

In this possible implementation, it is limited that the terminal device receives the RS in a blind detection manner. This improves implementability of the solution.

Optionally, in a possible implementation of the second aspect, the foregoing step further includes: The terminal device determines a second PO, where the second PO is in first duration at the beginning of a first target sending time period; the terminal device determines whether the second PO includes first indication information, where the first indication information indicates that the network device sends the RS in the first target sending time period, and the first target sending time period belongs to the target sending time period; and the terminal device receives the RS based on the first indication information.

In this possible implementation, the terminal device may determine, based on the first indication information in the second PO of the terminal device, whether the RS is sent, and receive the RS based on the indication information. This improves accuracy of receiving the RS by the terminal device.

Optionally, in a possible implementation of the second aspect, the foregoing step further includes: The terminal device determines a third PO, where the third PO is in second duration before the first target sending time period; the terminal device determines whether the third PO includes second indication information, where the second indication information indicates that the network device sends the RS in the first target sending time period, and the first target sending time period belongs to the target sending time period; and the terminal device receives the RS based on the second indication information.

In this possible implementation, the terminal device may determine, based on the second indication information in the third PO of the terminal device, whether the RS is sent, and receive the RS based on the indication information. This improves accuracy of receiving the RS by the terminal device.

Optionally, in a possible implementation of the second aspect, in the foregoing step, the configuration information is further used to indicate a first time point and a second time point in the target sending time period, and the terminal device attempts to receive the RS in a time period between the first time point and the second time point.

In this possible implementation, the terminal device determines, based on the configuration information, that the network device attempts to receive the RS between the first time point and the second time point based on the first periodicity. This improves receiving efficiency.

Optionally, in a possible implementation of the second aspect, the foregoing step further includes: The terminal device performs time-frequency tracking based on the RS.

In this possible implementation, the terminal device does not need to receive an SSB before a PO to perform time-frequency tracking. In addition, when the RS is a TRS, a transmit bandwidth, time domain density, and frequency domain density of the TRS are greater than those of the SSB, and the TRS has better transmission resource performance.

Optionally, in a possible implementation of the second aspect, in the foregoing step, the RS is a CSI-RS or a TRS.

In this possible implementation, the RS is specifically limited. This improves implementability of the solution.

A third aspect of this application provides a network device, configured to perform the method according to any one of the first aspect or the possible implementations of the first aspect. Specifically, the apparatus includes modules or units configured to perform the method according to any one of the first aspect or the possible implementations of the first aspect.

A fourth aspect of this application provides a terminal device, configured to perform the method according to any one of the second aspect or the possible implementations of the second aspect. Specifically, the apparatus includes modules or units configured to perform the method according to any one of the second aspect or the possible implementations of the second aspect.

A fifth aspect of this application provides a network device. The network device includes at least one processor and at least one communication interface. The at least one communication interface is configured to provide data and/or information input/output for the at least one processor; and the at least one processor is configured to process the data and/or the information, so that the network device implements the method according to any one of the first aspect or the possible implementations of the first aspect.

A sixth aspect of this application provides a terminal device. The terminal device includes at least one processor and at least one communication interface. The at least one communication interface is configured to provide data and/or information input/output for the at least one processor; and the at least one processor is configured to process the data and/or the information, so that the terminal device implements the method according to any one of the second aspect or the possible implementations of the second aspect.

A seventh aspect of this application provides a computer storage medium. The computer storage medium stores instructions. When the instructions are executed on a computer, the computer is enabled to perform the method according to any one of the first aspect or the possible implementations of the first aspect, or any one of the second aspect or the possible implementations of the second aspect.

An eighth aspect of this application provides a computer program product. When the computer program product runs on a computer, the computer is enabled to perform the method according to any one of the first aspect or the possible implementations of the first aspect, or any one of the second aspect or the possible implementations of the second aspect.

For technical effects brought by any one of the third aspect, the fifth aspect, the seventh aspect, and the eighth aspect, or the possible implementations thereof, refer to the technical effects brought by the first aspect or the different possible implementations of the first aspect. Details are not described herein again.

For technical effects brought by any one of the fourth aspect, the sixth aspect, the eighth aspect, and the eighth aspect, or the possible implementations thereof, refer to the technical effects brought by the second aspect or the different possible implementations of the second aspect. Details are not described herein again.

DETAILED DESCRIPTION OF ILLUSTRATIVE EMBODIMENTS

Embodiments of this application provide a reference signal transmission method and a related device, applied to a scenario in which a network device needs to communicate with a terminal device when the terminal device is in an idle state (RRC_IDLE) or an inactive state (RRC_INACTIVE).

The following clearly and completely describes the technical solutions in embodiments of this application with reference to the accompanying drawings in embodiments of this application. It is clear that the described embodiments are merely some but not all of embodiments of this application.

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way are interchangeable in appropriate circumstances so that the embodiments described herein can be implemented in an order other than the order illustrated or described herein. "A plurality of" means two or more. In view of this, "a plurality of" may also be understood as "at least two" in embodiments of this application. In addition, the terms "include", "comprise", and any other variants mean to cover the non-exclusive inclusion, for example, a process, method, system, product, or device that includes a list of steps or units is not necessarily limited to those expressly listed steps or units, but may include other steps or units that are not expressly listed or that are inherent to such a process, method, product, or device.

Figures 1, 2:
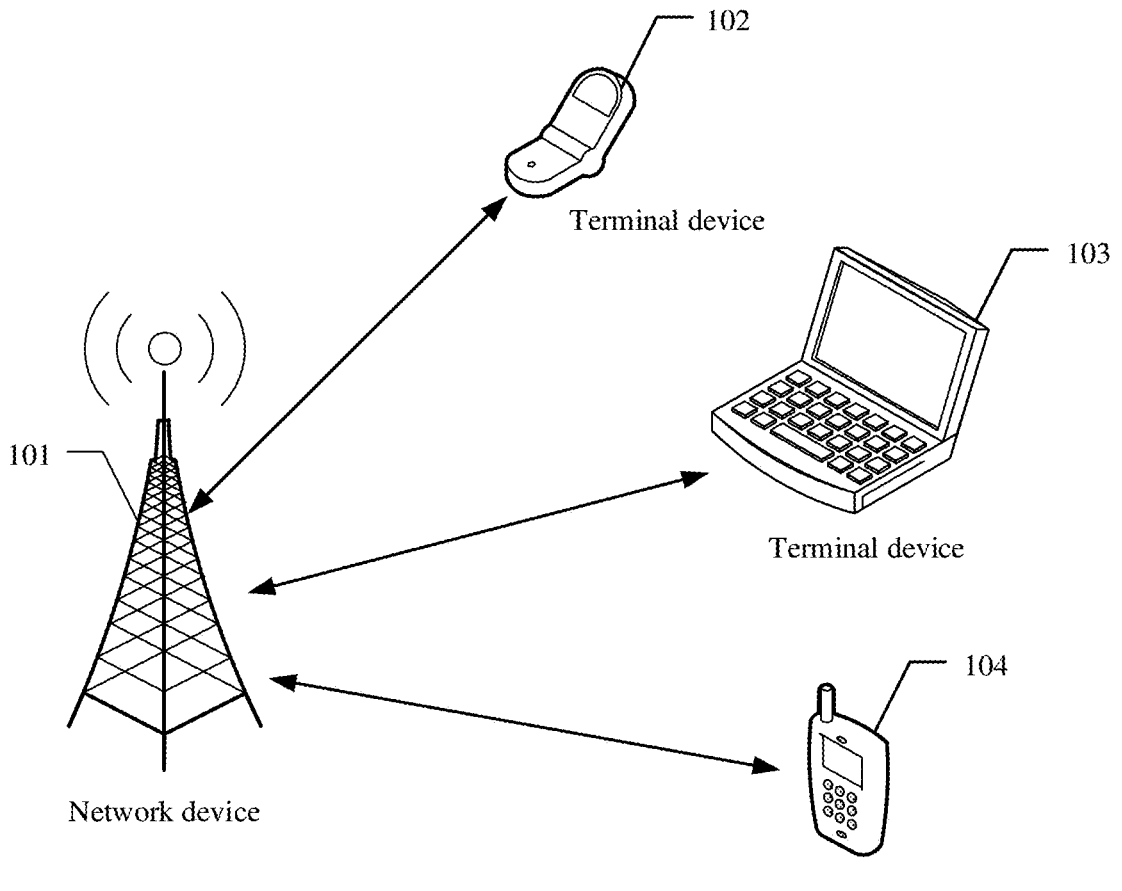
FIG. 1 is a schematic diagram of a communication system according to an embodiment of this application.
FIG. 2 is a schematic diagram of a discontinuous reception periodicity of UE according to an embodiment of this application.

FIG. 1 is a schematic diagram of a communication system. The communication system may include a network device 101 and terminal devices 102 to 104 connected to the network device 101.

In this embodiment of this application, only one network device 101 and three terminal devices 102 to 104 are used as an example for description. In actual application, the communication system in this embodiment of this application may include more network devices 101 and terminal devices 102, and there may be one or more terminal devices 102. A quantity of network devices 101 and a quantity of terminal devices 102 are not limited in this embodiment of this application.

The network device 101 in this embodiment of this application may be any device having a wireless sending/receiving function, including but not limited to: a base station (for example, a base station in a fifth generation communication system or a base station in a future communication system), a remote radio unit (RRU), a wireless relay node, a wireless backhaul node, a transmission reception node (TRP), a wireless controller in a cloud radio access network (CRAN) scenario, and the like. This is not specifically limited herein.

The terminal device in embodiments of this application may be a device that provides voice and/or data connectivity for a user, a handheld device with a wireless connection function, or another processing device connected to a wireless modem. The terminal device may be a mobile terminal, for example, a mobile phone (or referred to as a "cellular" phone), and a computer that has a mobile terminal. For example, the terminal device may be a portable, pocket-size, handheld, computer built-in, or vehicle-mounted mobile apparatus. These mobile apparatuses exchange voice and/or data with a network device. For example, it may be a device such as a personal communication service (PCS) phone, a cordless telephone set, a Session Initiation Protocol (SIP) phone, a wireless local loop (WLL) station, or a personal digital assistant (PDA). The terminal device may also be referred to as a system, a subscriber unit (Subscriber Unit), a subscriber station, a mobile station, a mobile, a remote station, an access point, a remote terminal, an access terminal, a user terminal, a user agent, a user device, or user equipment. In addition, the terminal device may alternatively be a chip system configured to implement a function of UE. In embodiments of this application, only an example in which the terminal device is user equipment UE is used for description.

The third Generation Partnership Project (3GPP) standards organization is developing protocol standards for the 5th generation cellular mobile communication system. Compared with a long term evolution (LTE) system, an NR system supports a larger transmission bandwidth, more transceiver antenna arrays, a higher transmission rate, and a more flexible scheduling mechanism with a smaller granularity. The foregoing features of the NR system provide wider application scopes, but greatly increase power consumption burden of UE.

For reduction of UE power consumption, the 3GPP introduces a power saving research subject in the NR rel-16 (new radio release 16) version, to study possible solutions for reducing power consumption of the UE in various states (including a connected state, an idle state, an inactive state, and the like). How to reduce UE power consumption in a connected state is a research focus.

The 3GPP designs a discontinuous reception (DRX) mechanism to reduce power consumption of UE in a connected state. Main features of the discontinuous reception mechanism are shown in a schematic diagram of a DRX periodicity shown in FIG. 2.

An elementary time unit in a DRX state is a DRX cycle, and duration of the DRX cycle is referred to as a DRX periodicity 200. A DRX cycle may also be referred to as a DRX periodicity 200, including sleep duration 201 (sleep, also referred to as discontinuous reception off, DRX_OFF) and wake-up duration 202 (on duration, also referred to as discontinuous reception on, DRX_ON, active time, or activation time).

During the sleep duration 201 of the DRX periodicity 200, UE in a sleep mode may completely turn off a communication component (for example, a radio frequency transceiver or a baseband processor) to reduce power consumption. During the wake-up duration 202 of the DRX periodicity 200, UE in a wake-up mode monitors a downlink control channel (PDCCH) and starts an inactive timer. Once downlink control information (DCI) is received in the downlink control channel, the UE restarts the inactive timer for timing calculation. If the inactive timer expires, the UE returns to the sleep mode.

Generally, the UE does not wake up when the wake-up duration 202 starts, but wakes up in a period of time such as several slots before the wake-up duration 202 starts. One slot may include 12 or 14 symbols. After waking up in advance, the UE receives a downlink reference signal and performs operations such as time-frequency offset synchronization, to prevent a deviation between a clock of the UE and a clock of a base station and a deviation between an operating frequency of the UE and a frequency domain of the base station that are caused because the UE is in the sleep mode for a long period of time. In addition, the UE may attempt to update a system message.

A network device may send a paging message to the UE. The paging message may be for notifying the UE to receive a paging request and update system information, or notify the UE to receive an earthquake or tsunami warning system service or a commercial mobile alert service. In consideration of energy saving, paging reception of the UE complies with a DRX principle.

Figure 3:
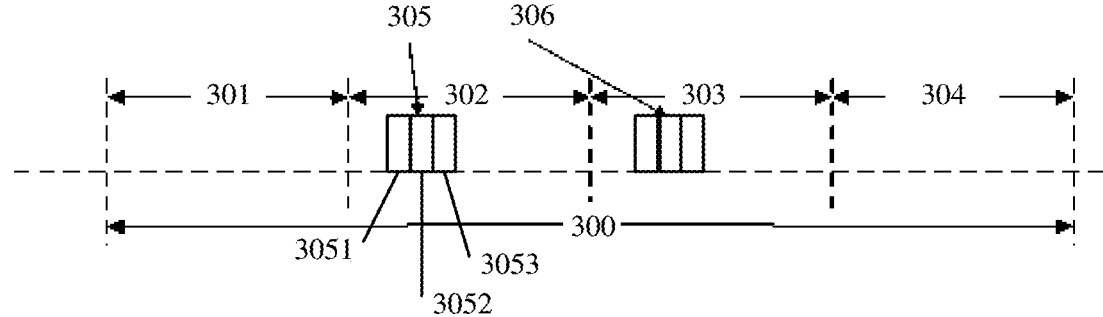
FIG. 3 is a schematic diagram of a search space set periodicity according to an embodiment of this application.

A sending occasion in a paging message is sent in a predefined search space set, and the search space set has a preconfigured bandwidth and a preconfigured sending periodicity on a time-frequency resource. The search space set is configured in a control resource set (CORESET), and a frequency resource occupied by the search space set is defined in the control resource set. However, in time domain, a sending periodicity of the search space set may be one slot to 2560 slots, and in each periodicity, a wake-up signal may be sent in one or several consecutive slots. For details, refer to FIG. 3.

In this embodiment of this application, a search space set periodicity 300 is used as an example for description. The search space set periodicity 300 includes slots 301 to 304, and a quantity of slots included in the search space set periodicity 300 is not limited.

In each slot for sending a paging message, the network device may further configure a specific location for sending the paging message in each slot for sending the paging message. A sending moment of the paging message may be indicated by using one to three symbols in one slot, for example, 3051 to 3053, and these symbols may be referred to as monitoring occasions 305 to 306. In the configured search space set periodicity 300, the UE determines a paging occasion in a periodicity based on a slot location of a paging message in each periodicity, (slots 302 and 303 in which the paging message appears in FIG. 3), locations of paging occasions 305 to 306 in each slot, and a quantity of symbols included in the paging occasion (quantities of symbols included in the paging occasion 305 and paging occasion 306 are both 3 in FIG. 3).

There are three states for the UE: a connected state, an idle state, and an inactive state. The UE in the connected or inactive state usually disables a receiver and enters a low power consumption state. The UE wakes up from the low power consumption state at regular times and attempts to receive paging. A paging receiving process may be as follows: A network device broadcasts a system parameter to all UEs; each UE obtains, based on the system parameter, a paging frame (PF) and a paging occasion (PO) that are occupied by a corresponding paging message on a physical downlink shared channel (PDSCH); and the UE monitors, starting from a PO subframe of the PF, whether there is a paging radio network temporary identifier (P-RNTI) on a physical downlink control channel (PDCCH). If there is a paging radio network temporary identifier, the UE obtains, from the PDCCH, information about a time-frequency resource occupied by the paging message. Finally, the UE receives a paging message on the time-frequency resource of the PDSCH. It should be understood that the network device does not send a paging message to the UE on each PO. The UE detects paging DCI on a PO to determine whether the network device sends paging. UE in an idle state and UE in an inactive state attempt to receive paging only in a PF.

Before the UE wakes up in the idle state and the inactive state to attempt to receive the paging, to ensure reception performance, the UE may adjust some parameters of a receiver through, for example, time-frequency tracking, which is also referred to as time-frequency synchronization. Due to the limitation of manufacturing costs, precision of a crystal oscillator generating frequencies used by the UE is not very high. As a result, after the UE is powered on and runs for a period of time, time and an operating frequency that are maintained by the UE are deviated from a clock and a frequency of a network. Therefore, a base station needs to send a specific reference signal for the UE to estimate a timing offset, a frequency domain offset, delay spread, and Doppler spread between the UE and the base station, and compensate for a time-frequency offset of the UE. In the idle state and the inactive state, the UE usually performs preliminary time-frequency tracking by receiving an SSB. In the connected state, the UE may further receive a time-frequency tracking reference signal (Channel State Information reference signal for tracking, TRS) to perform accurate time-frequency tracking.

Figure 4:
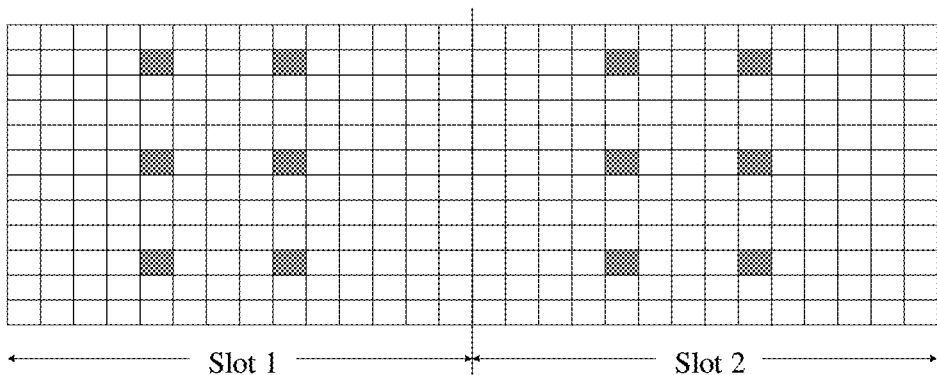
FIG. 4 is a schematic diagram of a CSI-RS resource according to an embodiment of this application.

The 3GPP defines the following content: A TRS is for accurate time-frequency estimation by UE. A TRS in NR is a special example of a channel state information-reference signal (CSI-RS), and is configured by using a non-zero power channel state information-reference signal resource set (NZP CSI-RS resource set). Each CSI-RS resource set includes two or four CSI-RS resources, and each CSI-RS resource represents a resource element sent on one symbol with specific frequency domain density and bandwidth. Each CSI-RS resource is sent at a different symbol location, but shares a same transmit bandwidth, density, and frequency domain location, as shown in FIG. 4.

The TRS is configured for the UE in the connected state by using UE-dedicated radio resource control (RRC) signaling, and there is no dedicated RRC signaling for the UE in the non-connected state. Therefore, time-frequency synchronization can be performed only by using the SSB. For the UE in the non-connected state, it can be assumed only that a sending periodicity of the SSB is 20 ms. Corresponding wake-up duration of the UE may be one SSB periodicity, or may be two SSB periodicities. Consequently, power consumption overheads of the UE are large. A signal resource that can be received by the UE in the non-connected state is limited. Because there is no dedicated configuration signaling for the UE in the non-connected state, it is proposed that a reference signal (RS) is configured for all UEs by using a system message. However, if the RS is the same as a CRS in LTE, the RS becomes a cell-specific signal that is always sent, and occupies a large quantity of time-frequency resources. In addition, in subsequent evolution of NR, avoidance of the RS signaling needs to be considered. Consequently, forward compatibility is affected.

Embodiments of this application provide a reference signal transmission method. Density of received signal resources of the UE in the non-connected state can be increased, and the RS is not changed into a cell-specific signal. This facilitates subsequent evolution of NR.

The following describes a reference signal transmission method in an embodiment of this application with reference to schematic diagrams of FIG. 1 to FIG. 4.

Figure 5:
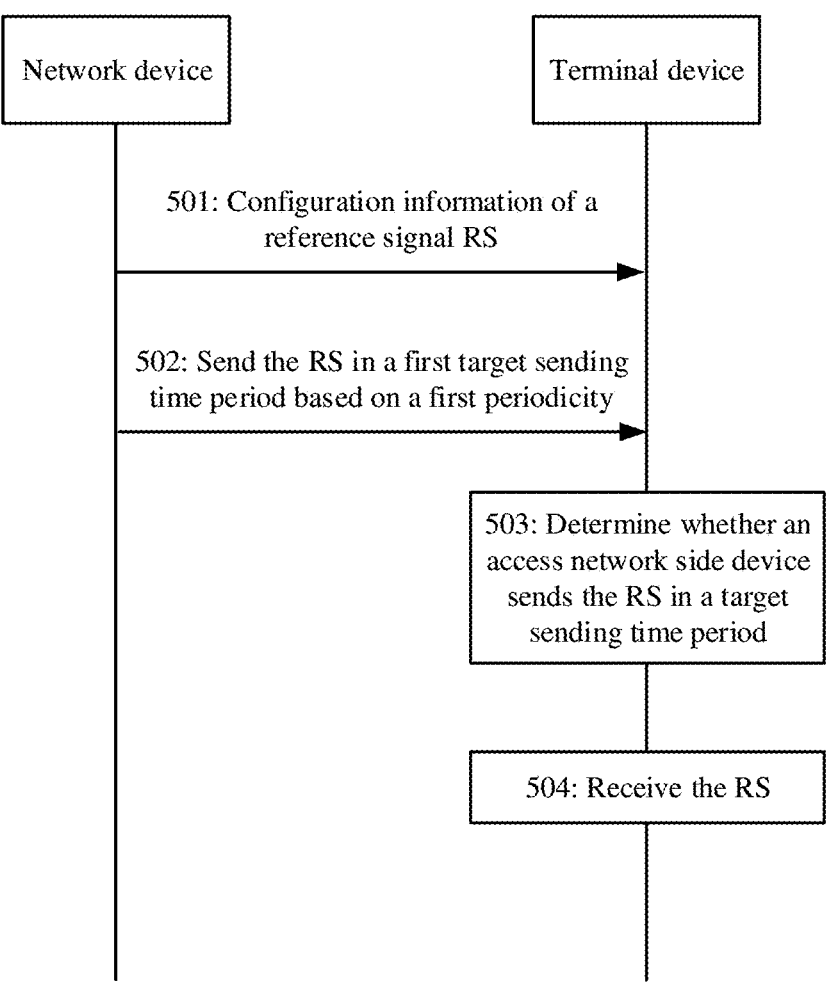
FIG. 5 is a schematic flowchart of a reference signal receiving method according to an embodiment of this application.

Refer to FIG. 5. An embodiment of a reference signal transmission method in embodiments of this application includes the following steps.

501: A network device sends configuration information of a reference signal RS to a terminal device.

The network device sends configuration information of one or more RSs to the terminal device. In this embodiment of this application, configuration information of an RS is sent in a plurality of manners. The following separately describes the manners.

1. UE has not established a connection to a network device before, and the network device sends configuration information of an RS through broadcast or in a manner of a system message.

2. UE has previously established a connection to a network device, and the network device sends configuration information of an RS to a terminal device through the previously established connection.

The RS in this embodiment of this application may be a CSI-RS, a TRS, or the like. This is not specifically limited herein.

The configuration information in this embodiment of this application includes a parameter of a target sending time period. An access network side configures the target sending time period. The target sending time period may also be referred to as a monitoring occasion, and the target sending time period is configured in a periodic manner.

Optionally, the configuration information further includes a frequency bandwidth occupied by the RS, a frequency pattern, a sending periodicity (that is, tin FIG. 6) of the RS in time domain, a sending slot in each periodicity t, a symbol in each slot, and the like.

If the configuration information does not include a parameter such as a frequency bandwidth occupied by the RS, a frequency pattern, a sending periodicity of the RS in time domain (that is, tin FIG. 6), and a sending slot of each periodicity t and a symbol in each slot, the parameters may be sent before or after the configuration information. [0090] 502: The network device sends the RS to the terminal device in a first target sending time period based on a first periodicity.

In this embodiment of this application, a target sending time period in which an RS is sent is referred to as a first target sending time period, and a target sending time period in which an RS is not sent is referred to as a second target sending time period. In other words, the RS is not an always-on signal.

Figure 6:
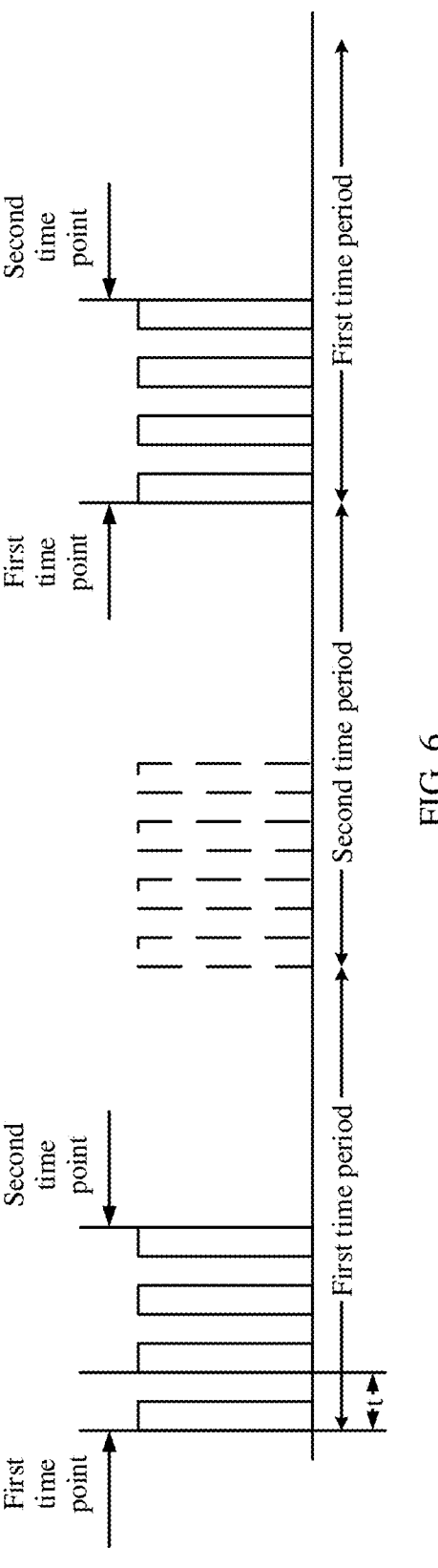
FIG. 6 is a schematic diagram of a slot for sending an RS according to an embodiment of this application.
Figure 7:
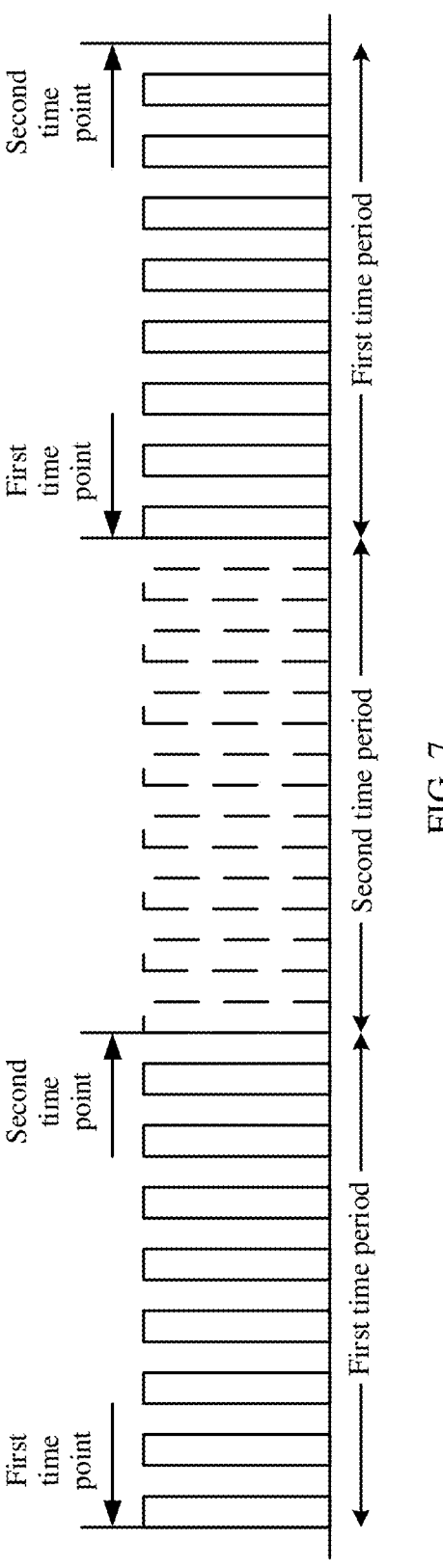
FIG. 7 is another schematic diagram of a slot for sending an RS according to an embodiment of this application.

The network device sends the RS to the terminal device in the first target sending time period based on the first periodicity. A solid-line vertical bar shown in FIG. 6 or FIG. 7 represents a slot for sending the RS, and the RS is not sent in the second target sending time period, as shown in FIG. 6 or FIG. 7, where a dashed-line vertical bar represents that the RS is not sent.

In this embodiment of this application, the first target sending time period includes a plurality of first periodicities. As shown in FIG. 6, the first target sending time period includes four first periodicities t. As shown in FIG. 7, the first target sending time period includes eight first periodicities t. A quantity of first periodicities included in a first target sending time period and a quantity of slots included in a first periodicity t are not limited herein.

In this embodiment of this application, a target sending time period is longer than or equal to a first periodicity. This is not specifically limited herein. If the target sending time period is longer than the first periodicity, energy saving of UE is facilitated.

In this embodiment of this application, the network device sends the RS in a plurality of manners. The following separately describes the manners.

1. The network device sends the RS in a plurality of slots from the beginning to the end of a first PO based on the first periodicity.

In this embodiment of this application, the RS is sent only in a plurality of slots from the beginning to the end of a PO. This reduces air interface resource overheads of the RS.

Figure 8:
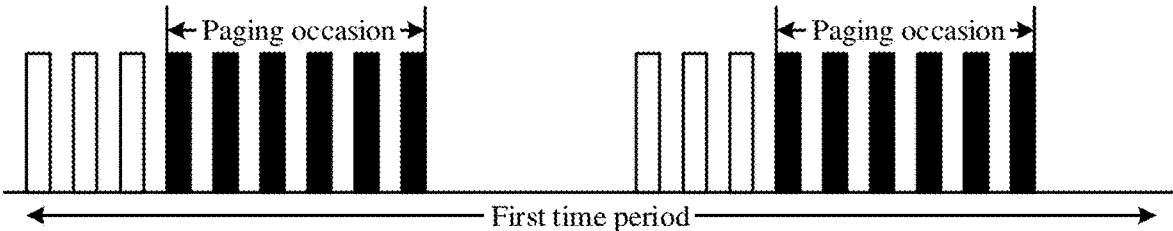
FIG. 8 is a schematic diagram of a first PO and an RS sending periodicity according to an embodiment of this application.

2. The network device sends the RS based on the first periodicity in N slots before a first slot corresponding to a first PO and in a plurality of slots from the beginning to the end of the first PO, where N is an integer greater than or equal to 1. As shown in FIG. 8, a first target sending time period includes monitoring occasions corresponding to two POs, each PO corresponds to six slots, and N is 3 (that is, the network device sends the RS in the third slot before the first PO and in the six slots of the first PO). A quantity of POs, a value of N, and a quantity of slots corresponding to a PO are not limited herein.

In this embodiment of this application, the RS appears only near a first PO in one target sending time period. This reduces air interface resource overheads of the RS.

Further, the network device may configure a first time point (T_start) and a second time point (T_stop) in a first target sending time period, and send the RS only between T_start and T_stop (as shown in FIG. 6 and FIG. 7). If the network device configures T_start and T_stop, the configuration information in step 502 further includes a related parameter of T_start and T_stop (the related parameter includes detection duration TD). A method for configuring T_start is as follows:

$$T\_start = SFN * T \bmod 1024.$$

SFN is a system frame number, and T is duration of the target sending time period. When duration between the first time point and the second time point is equal to the duration of the target sending time period, it indicates that the RS is sent in all slots in the entire first target sending time period (as shown in FIG. 7).

In this embodiment of this application, the foregoing manners of sending the RS are merely examples. It may be understood that the RS may be sent in another manner. This is not specifically limited herein.

Figure 9:
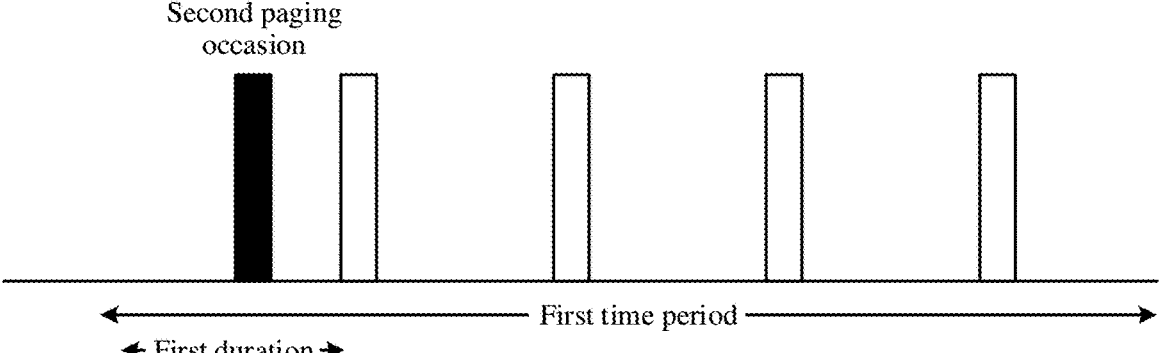
FIG. 9 is a schematic diagram of a second PO and an RS sending periodicity according to an embodiment of this application.
Figure 10:
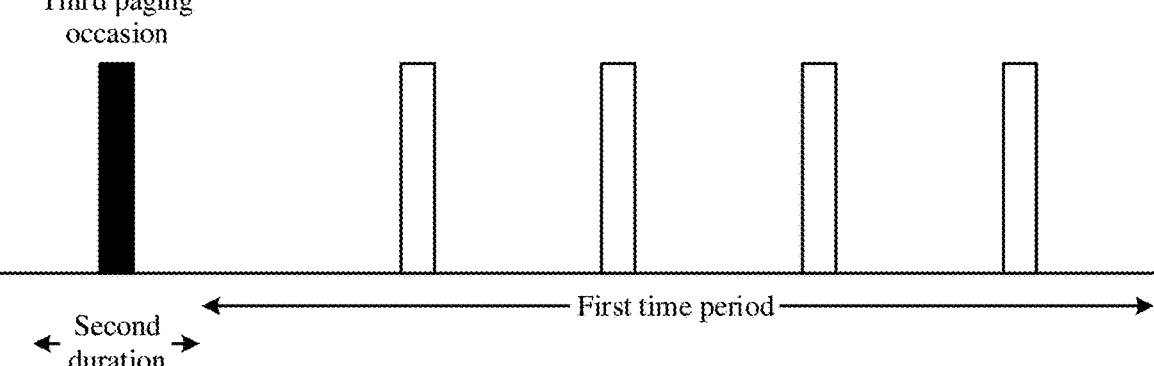
FIG. 10 is a schematic diagram of a third PO and an RS sending periodicity according to an embodiment of this application.

Optionally, the network device may add indication information to paging DCI or a paging message scheduled by using DCI, to indicate that the UE in the non-connected state receives the RS. To be specific, the network device configures detection duration TD1 (namely, first duration) and/or detection duration TD2 (namely, second duration). As shown in FIG. 9 or FIG. 10, in detection duration TD1 at the beginning of a first target sending time period, the network device indicates, in paging DCI or a paging message scheduled by using DCI that is sent on a second PO in the TD1, whether the network device sends the RS based on the first periodicity in a first target sending time period including the second PO (that is, first indication information indicates whether the network device sends the RS based on the first periodicity in the first target sending time period including the second PO). In detection duration TD2 at the beginning of a first target sending time period, the network device indicates, in paging DCI or a paging message scheduled by using DCI that is sent on a third PO in the TD2, whether the network device sends the RS based on the first periodicity in one or more first target sending time periods after the third PO (that is, second indication information indicates whether the network device sends the RS based on the first periodicity in the one or more first target sending time periods after the third PO). If the network device configures detection duration TD, the configuration information in step 502 further includes a related parameter of the detection duration TD.

The indication message may be sent in paging DCI sent on a PO, may be in a paging message scheduled by using DCI, or may be in another manner. This is not specifically limited herein.

Further, the network device adds the indication information only when a slot interval between a PO and a first target sending time period reaches a target threshold. The target threshold is set based on an actual requirement, for example, two slots. This is not specifically limited herein.

503: The terminal device determines whether the access network side sends the RS in a target sending time period.

After receiving the configuration information of the RS, the UE determines whether the access network side sends the RS in a target sending time period.

In this embodiment of this application, the terminal device determines, in a plurality of manners, whether the network device sends the RS in a target sending time period. The following separately describes the manners.

1. The UE in the non-connected state detects, through blind detection, whether the network device sends the RS. Specific steps are as follows.

The UE in the non-connected state receives a target signal based on a frequency and time that are indicated by the configuration information of the RS. The UE calculates received signal quality of the target signal. If the received signal quality meets a preset condition, the UE determines that the network device sends the RS in a target sending time period (that is, the target sending time period is a first target sending time period). If the received signal quality does not meet a preset condition, the UE determines that the network device does not send the RS in a target sending time period (that is, the target sending time period is a second target sending time period). The preset condition in this embodiment of this application is set based on an actual requirement. For example, the preset condition may be that the received signal quality meets a value. This is not specifically limited herein.

The target signal in this embodiment of this application may be reference signal received power (RSRP), reference signal received quality (RSRQ), or another signal. For example, the target signal is a reference signal received strength indicator (RSSI). This is not specifically limited herein.

For example, when the target signal is RSRP, the UE in the non-connected state obtains through calculation that the received signal quality of the target signal is 90 decibel-milliwatts (dBM), and the preset condition is not less than 85 dBM. In this case, the received signal quality of the target signal meets the preset condition, and the UE determines that the network device sends the RS in the target sending time period based on the first periodicity.

2. The UE in the non-connected state determines, by using indication information in a PO, whether the access network side sends the RS in a target sending time period.

In this embodiment of this application, the UE in the non-connected state determines, in a plurality of manners by using indication information in a PO, whether the access network side sends the RS in a target sending time period. The following separately describes the manners.

2.1 The UE in the non-connected state determines a second PO or a third PO corresponding to a UEID of the UE, checks whether first indication information or second indication information is included in paging DCI or a paging message scheduled by using DCI, and receives the RS based on the first indication information or the second indication information. The first indication information indicates that the network device sends the RS based on the first periodicity in the target sending time period including the second PO. The second indication information indicates that the network device sends the RS based on the first periodicity in one or more target sending time periods after the third PO.

2.2 The UE in the non-connected state determines a fourth PO or a fifth PO corresponding to another UE, checks whether third indication information or fourth indication information is included in paging DCI or a paging message scheduled by using DCI, and receives the RS based on the third indication information or the fourth indication information. The third indication information indicates that the network device sends the RS based on the first periodicity in the target sending time period including the fourth PO. The fourth indication information indicates that the network device sends the RS based on the first periodicity in one or more target sending time periods after the fifth PO.

In this embodiment of this application, the UE may indicate, by using a PO, whether to send the RS in a current or subsequent target sending time period. This reduces blind detection overheads of the UE.

In this embodiment of this application, the UE in the non-connected state determines, in a plurality of manners, whether the network device sends the RS in a target sending time period. The foregoing two manners are merely examples, and a determining manner is not specifically limited herein.

504: The terminal device receives the RS.

When determining that the network device sends the RS in a target sending time period (that is, a specific target sending time period is determined as a first target sending time period), the UE in the non-connected state receives the RS in the first target sending time period.

Optionally, the UE may first determine a PO, and attempt to receive the RS in a slot of the PO.

For example, when the RS is a TRS, after receiving the CSI-RS or the TRS, the UE in the non-connected state may perform operations such as time-frequency offset estimation and automatic gain control by using the TRS in the first target sending time period, without receiving an SSB before the PO. In addition, a transmit bandwidth, time domain density, and frequency domain density of the TRS are greater than those of the SSB, and the TRS has better transmission resource performance.

In this embodiment of this application, a network device sends configuration information of one or more RSs, configures a target sending time period, and sends the RS in a first target sending time period based on a first periodicity. The target sending time period includes the first target sending time period and a second target sending time period, and the RS is not sent in the second target sending time period. In this case, the RS is sent only in a part of the target sending time period, that is, the RS is not an always-on signal, and the RS is not changed into a cell-specific signal. This facilitates subsequent evolution of NR. In addition, a periodicity of the RS may be less than 20 ms, and corresponding wake-up duration may be shorter than that of an SSB. This helps UE reduce power consumption.

Figures 11, 12, 13:
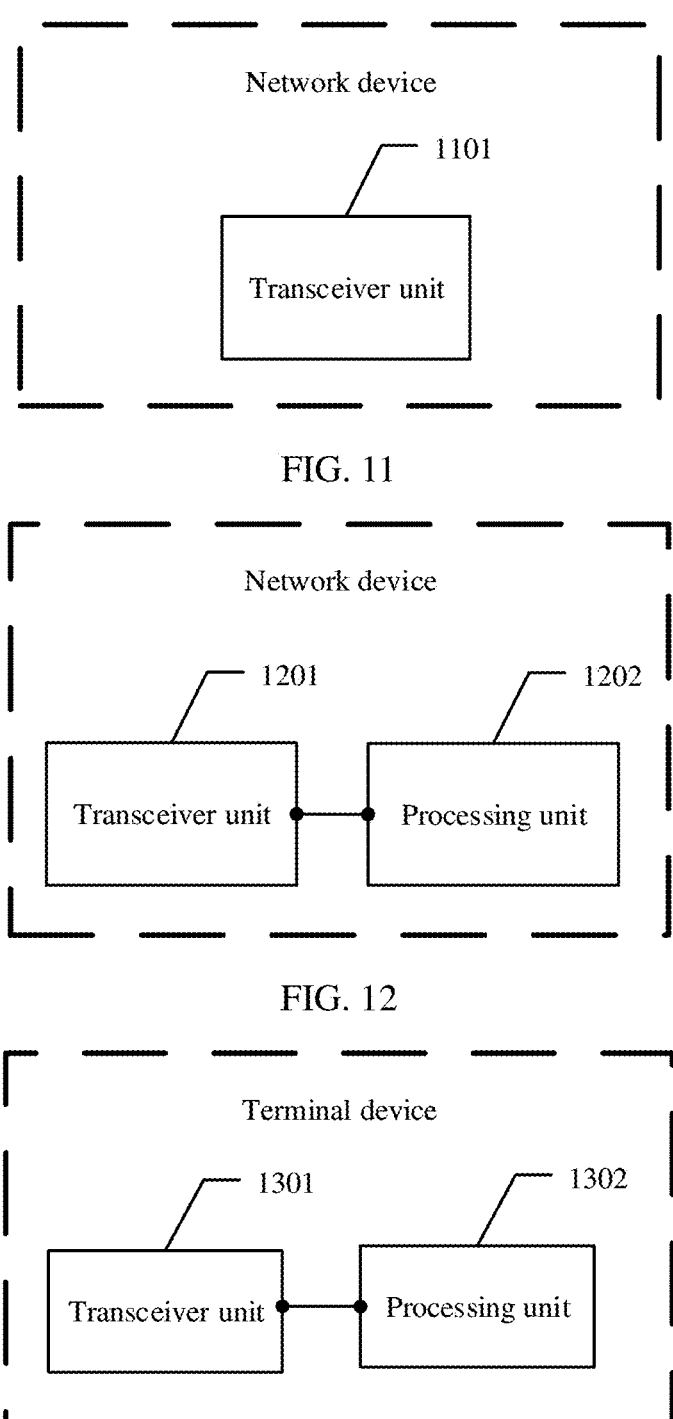
FIG. 11 is a schematic diagram of a structure of a network device according to an embodiment of this application.
FIG. 12 is another schematic diagram of a structure of a network device according to an embodiment of this application.
FIG. 13 is a schematic diagram of a structure of a terminal device according to an embodiment of this application.

The foregoing describes the reference signal receiving method in embodiments of this application, and the following describes a network device in embodiments of this application. Refer to FIG. 11. An embodiment of a network device in embodiments of this application includes a transceiver unit 1101, configured to send configuration information of a reference signal RS to a terminal device, where the configuration information is used to indicate at least one periodic target sending time period of the RS.

The transceiver unit 1101 is further configured to send the RS in a first target sending time period based on a first periodicity. The first target sending time period belongs to the at least one periodic target sending time period.

In this embodiment, operations performed by the units of the network device are similar to those described in the foregoing embodiment shown in FIG. 5. Details are not described herein again.

In this embodiment, the transceiver unit 1101 sends the configuration information of the reference signal RS to the terminal device, and sends the RS in the first target sending time period based on the first periodicity by configuring the target sending time period, where the target sending time period includes the first target sending time period. In this case, the RS is sent only in a part of the target sending time period, that is, the RS is not an always-on signal, and wake-up duration of the UE is short. This helps UE reduce power consumption.

Refer to FIG. 12. Another embodiment of a network device in this embodiment of this application includes a transceiver unit 1201, configured to send configuration information of a reference signal RS to a terminal device, where the configuration information is used to indicate at least one periodic target sending time period of the RS.

The transceiver unit 1201 is further configured to send the RS in a first target sending time period based on a first periodicity. The first target sending time period belongs to the at least one periodic target sending time period.

The network device in this embodiment further includes a processing unit 1202, configured to determine a first paging occasion PO.

The processing unit 1202 is further configured to determine a second PO. The second PO is in first duration at the beginning of the first target sending time period.

The processing unit 1202 is further configured to determine a third PO. The third PO is in second duration before the first target sending time period.

In this embodiment, operations performed by the units of the network device are similar to those described in the foregoing embodiment shown in FIG. 5. Details are not described herein again.

In this embodiment, the transceiver unit 1201 sends the configuration information of the reference signal RS to the terminal device, and sends the RS in the first target sending time period based on the first periodicity by configuring the target sending time period, where the target sending time period includes the first target sending time period. In this case, the RS is sent only in a part of the target sending time period, that is, the RS is not an always-on signal, and wake-up duration of the UE is short. This helps UE reduce power consumption. In addition, the processing unit 1202 indicates, by sending indication information, a specific target sending time period in which the terminal device receives the RS. This improves efficiency of receiving the RS on a terminal side.

The following describes a terminal device in embodiments of this application. Refer to FIG. 13. An embodiment of a terminal device in embodiments of this application includes a transceiver unit 1301, configured to receive configuration information of a reference signal RS from a network device. The configuration information is used to indicate at least one periodic target sending time period of the RS, and a processing unit 1302, configured to determine whether the network device sends the RS in a target sending time period.

The transceiver unit 1301 is further configured to receive the RS if the network device sends the RS in the target sending time period.

In this embodiment, operations performed by the units of the terminal device are similar to those described in the foregoing embodiment shown in FIG. 5. Details are not described herein again.

In this embodiment, the transceiver unit 1301 receives the configuration information of the reference signal RS, the processing unit 1302 determines whether the network device sends the RS in the target sending time period, and the transceiver unit 1301 receives the RS if the network device sends the RS in the target sending time period. In this case, the RS is received only in a part of the target sending time period, that is, the RS is not an always-on signal, and wake-up duration of the UE is short. This helps UE reduce power consumption.

Optionally, the processing unit 1302 in this embodiment is further configured to determine a first paging occasion PO.

The processing unit 1302 is further configured to calculate received signal quality of a target signal.

The processing unit 1302 is further configured to, if the received signal quality meets a preset condition, determine that the network device sends the RS in the target sending time period.

The processing unit 1302 is further configured to, if the received signal quality does not meet the preset condition, determine that the network device does not send the RS in the target sending time period.

The processing unit 1302 is further configured to determine a second PO. The second PO is in first duration at the beginning of a first target sending time period.

The processing unit 1302 is further configured to determine a third PO. The third PO is in second duration before the first target sending time period.

The processing unit 1302 is further configured to perform time-frequency tracking based on the RS.

In this embodiment, operations performed by the units of the terminal device are similar to those described in the foregoing embodiment shown in FIG. 5. Details are not described herein again.

In this embodiment, the transceiver unit 1301 receives the configuration information of the reference signal RS, the processing unit 1302 determines whether the network device sends the RS in the target sending time period, and the transceiver unit 1301 receives the RS if the network device sends the RS in the target sending time period. In this case, the RS is received only in a part of the target sending time period, that is, the RS is not an always-on signal, and wake-up duration of the UE is short. This helps UE reduce power consumption. In addition, a specific target sending time period in which the network device sends the RS is indicated in a manner of receiving indication information. This improves efficiency of receiving the RS by the transceiver unit 1301. Moreover, the processing unit 1302 does not need to receive an SSB before a PO to perform time-frequency tracking. In addition, when the RS is a TRS, a transmit bandwidth, time domain density, and frequency domain density of the TRS are greater than those of the SSB, and the TRS has better transmission resource performance.

Figure 14:
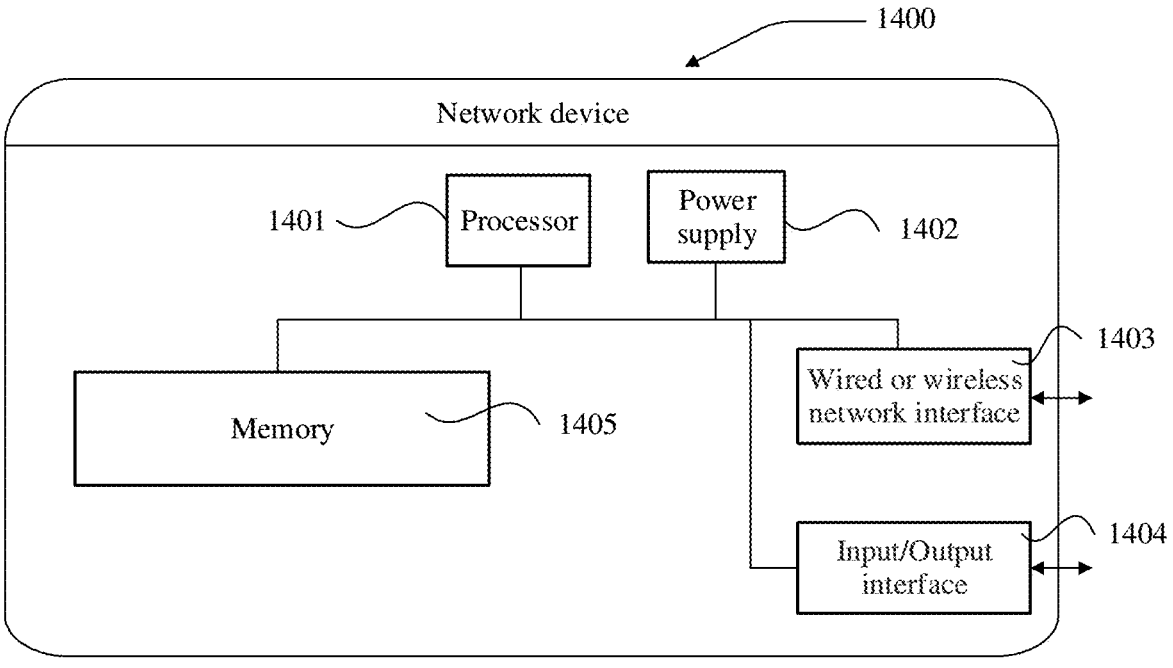
FIG. 14 is another schematic diagram of a structure of a network device according to an embodiment of this application.

The following describes a network device in embodiments of this application. Refer to FIG. 14. Another embodiment of a network device in embodiments of this application includes the following.

A network device 1400 includes at least one processor 1401 and at least one communication interface (namely, an input/output interface 1404 in FIG. 14). The input/output interface 1404 is configured to provide data and/or information input/output for a processor 1401, and the processor 1401 is configured to process the data and/or information.

Optionally, the network device 1400 further includes a memory 1405. The processor 1401 is coupled to the memory 1405 and the input/output interface 1404. The memory 1405 may be a volatile storage or a persistent storage. A program stored in the memory 1405 may include one or more modules, and each module may include a series of instruction operations for a server. Further, the processor 1401 may be configured to communicate with the memory 1405, and perform, on the network device 1400, the series of instruction operations in the memory 1405.

The network device 1400 may further include at least one power supply 1402, at least one wired or wireless network interface 1403, and/or at least one operating system such as Windows Server™, Mac OS X™, Unix™, Linux™ or FreeBSD™.

The processor 1401 may perform the operations performed by the network device in the embodiment shown in FIG. 5. Details are not described herein again.

Figure 15:
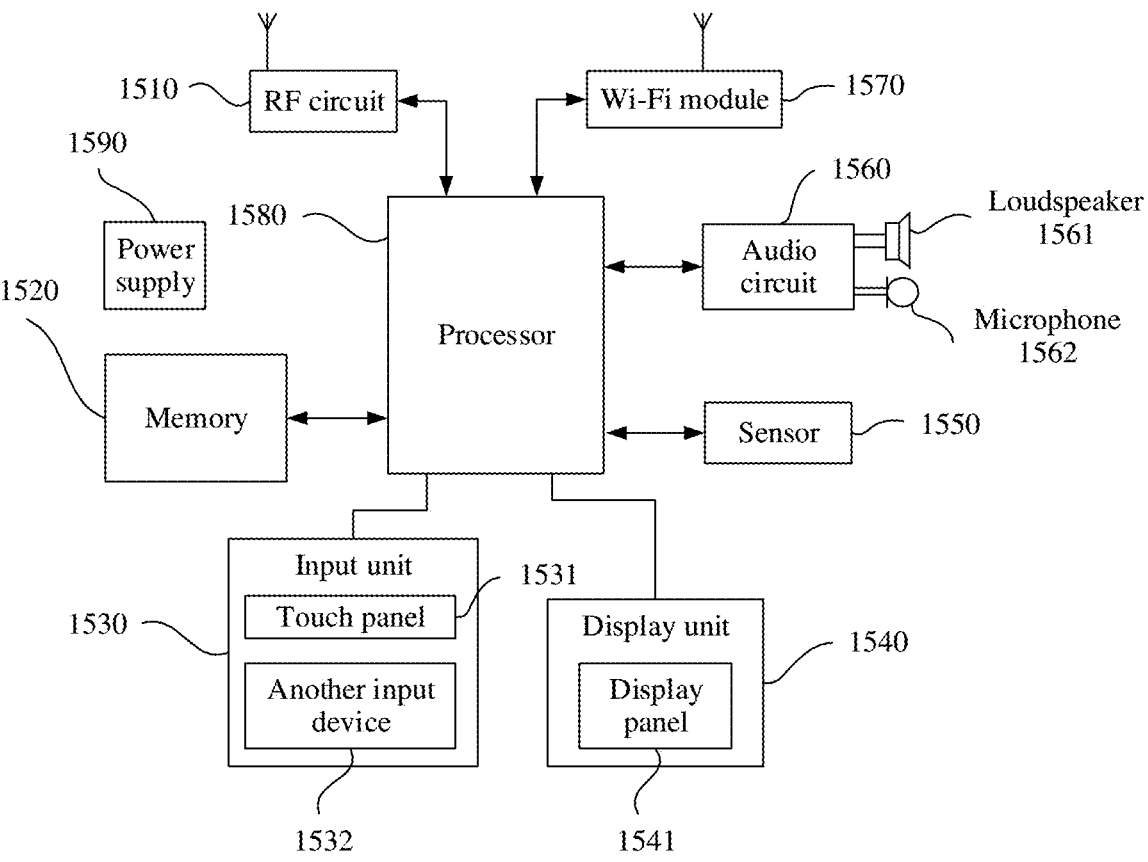
FIG. 15 is another schematic diagram of a structure of a terminal device according to an embodiment of this application.

As shown in FIG. 15, an embodiment of this application further provides another terminal device. For ease of description, only a part related to this embodiment of this application is described. For specific technical details that are not disclosed, refer to the method part in embodiments of this application. The terminal device may be any terminal device including a mobile phone, a tablet computer, a personal digital assistant (PDA), a point of sales device (POS), a vehicle-mounted computer, or the like. For example, the terminal device is a mobile phone.

FIG. 15 shows a block diagram of a partial structure of a mobile phone related to the terminal device according to this embodiment of this application. Refer to FIG. 15. The mobile phone includes components such as a radio frequency (RF) circuit 1510, a memory 1520, an input unit 1530, a display unit 1540, a sensor 1550, an audio circuit 1560, a Wi-Fi module 1570, a processor 1580, and a power supply 1590. A person skilled in the art may understand that the structure of the mobile phone shown in FIG. 15 does not constitute a limitation on the mobile phone. The mobile phone may include more or fewer components than those shown in the figure, or may include a combination of some components, or may include different component arrangements.

Each component of the mobile phone is specifically described below with reference to FIG. 15.

The RF circuit 1510 may be configured to receive and send a signal in an information receiving or sending process or a call process, and in particular, after receiving downlink information of a base station, send the downlink information to the processor 1580 for processing; and in addition, send related uplink data to the base station. Usually, the RF circuit 1510 includes but is not limited to an antenna, at least one amplifier, a transceiver, a coupler, a low noise amplifier (LNA), a duplexer, and the like. In addition, the RF circuit 1510 may further communicate with a network and another device through wireless communication. Any communication standard or protocol may be used for the wireless communication, and include but is not limited to global system for mobile communications (GSM), general packet radio service (GPRS), code division multiple access (CDMA), wideband code division multiple access (WCDMA), long term evolution (LTE), e-mail, short messaging service (SMS), and the like.

The memory 1520 may be configured to store a software program and a module. By running the software program and the module that are stored in the memory 1520, the processor 1580 executes various function applications of the mobile phone and processes data. The memory 1520 may mainly include a program storage area and a data storage area. The program storage area may store an operating system, an application program required by at least one function (such as a voice playing function and an image playing function), and the like. The data storage area may store data (such as audio data and a phone book) created according to use of the mobile phone, and the like. In addition, the memory 1520 may include a high-speed random access memory, and may further include a non-volatile memory, for example, at least one magnetic disk storage component, a flash memory component, or another volatile solid-state storage component.

The input unit 1530 may be configured to receive input digit or character information, and generate a key signal input related to a user setting and function control of the mobile phone. Specifically, the input unit 1530 may include a touch panel 1531 and another input device 1532. The touch panel 1531 is also referred to as a touchscreen and may collect a touch operation on or near the touch panel 1531 (such as an operation performed by a user on the touch panel 1531 or near the touch panel 1531 by using any proper object or accessory, such as a finger or a stylus), and drive a corresponding connection apparatus according to a preset program. Optionally, the touch panel 1531 may include two parts: a touch detection apparatus and a touch controller. The touch detection apparatus detects a touch orientation of a user, detects a signal brought by the touch operation, and sends the signal to the touch controller. The touch controller receives touch information from the touch detection apparatus, converts the touch information into contact coordinates, and sends the contact coordinates to the processor 1580, and can receive and execute a command sent by the processor 1580. In addition, the touch panel 1531 may be implemented by using a plurality of types such as a resistive type, a capacitive type, an infrared ray, and a surface acoustic wave. The input unit 1530 may further include another input device 1532 in addition to the touch panel 1531. Specifically, the another input device 1532 may include but is not limited to one or more of a physical keyboard, a function key (such as a volume control key or an on/off key), a trackball, a mouse, a joystick, and the like.

The display unit 1540 may be configured to display information input by the user or information provided for the user, and various menus of the mobile phone. The display unit 1540 may include a display panel 1541. Optionally, the display panel 1541 may be configured in a form of a liquid crystal display (LCD), an organic light-emitting diode (OLED), or the like. Further, the touch panel 1531 may cover the display panel 1541. When detecting a touch operation on or near the touch panel 1531, the touch panel 1531 transmits the touch operation to the processor 1580 to determine a type of a touch event, and then the processor 1580 provides corresponding visual output on the display panel 1541 according to the type of the touch event. In FIG. 15, the touch panel 1531 and the display panel 1541 are used as two independent parts to implement input and output functions of the mobile phone. However, in some embodiments, the touch panel 1531 and the display panel 1541 may be integrated to implement the input and output functions of the mobile phone.

The mobile phone may further include at least one sensor 1550, such as a light sensor, a motion sensor, or another sensor. Specifically, the light sensor may include an ambient light sensor and a proximity sensor. The ambient light sensor may adjust luminance of the display panel 1541 based on brightness of ambient light, and the proximity sensor may turn off the display panel 1541 and/or backlight when the mobile phone approaches an ear. As a type of movement sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may be further configured in the mobile phone. Details are not described herein.

The audio circuit 1560, a loudspeaker 1561, and a microphone 1562 may provide an audio interface between the user and the mobile phone. The audio circuit 1560 may transmit, to the loudspeaker 1561, an electrical signal converted from received audio data, and the loudspeaker 1561 converts the electrical signal to a sound signal for output; in another aspect, the microphone 1562 converts a collected sound signal into an electrical signal, and the audio circuit 1560 converts the electrical signal into audio data upon receipt of the electrical signal and outputs the audio data to the processor 1580 for processing, and then the audio data is sent to, for example, another mobile phone, by using the RF circuit 1510, or the audio data is output to the memory 1520 for further processing.

Wi-Fi belongs to a short-distance wireless transmission technology. The mobile phone may help, by using the Wi-Fi module 1570, the user receive and send an email, browse a web page, access streaming media, and the like. The Wi-Fi module 1570 provides wireless broadband internet access for the user. Although FIG. 15 shows the Wi-Fi module 1570, it may be understood that the Wi-Fi module 1570 is not a mandatory component of the mobile phone.

The processor 1580 is a control center of the mobile phone and is connected to each part of the entire mobile phone by using various interfaces and lines. By running or executing the software program and/or module that are stored in the memory 1520 and invoking data stored in the memory 1520, the processor 1580 implements various functions of the mobile phone and processes data, to perform overall monitoring on the mobile phone. Optionally, the processor 1580 may include one or more processing units. Preferably, an application processor and a modem processor may be integrated into the processor 1580. The application processor mainly processes an operating system, a user interface, an application program, and the like. The modem processor mainly processes wireless communication. It may be understood that the foregoing modem processor may also not be integrated into the processor 1580.

The mobile phone further includes the power supply 1590 (such as a battery) that supplies power to each part. Preferably, the power supply may be logically connected to the processor 1580 by using a power management system, to implement management functions such as charging management, discharging management, and power consumption management by using the power management system.

Although not shown, the mobile phone may further include a camera, a Bluetooth module, and the like. Details are not described herein.

In this embodiment of this application, the processor 1580 included in the terminal device may perform functions of the terminal device in the embodiment shown in FIG. 5. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in electrical, mechanical, or other forms.

The units described as separate parts may or may not be physically separate, and parts displayed as units may or may not be physical units, that is, they may be located in one position, or may be distributed on a plurality of network units. Some or all of the units may be selected according to actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A reference signal transmission method, comprising:
sending configuration information of a reference signal (RS) to a terminal device, wherein the configuration information comprises a parameter of at least one periodic target sending time period of the RS;
sending first indication information to the terminal device in paging downlink control information (DCI), wherein the first indication information indicates that a network device sends the RS in a first target sending time period; and
sending the RS in the first target sending time period based on a first periodicity, wherein the first target sending time period belongs to the at least one periodic target sending time period,
wherein each of the at least one periodic target sending time period is longer than the first periodicity.

2. The method according to claim 1, wherein the paging DCI is in a first duration at a beginning of the first target sending time period.

3. The method according to claim 1, wherein the configuration information indicates a first time point and a second time point in the first target sending time period, and wherein sending the RS in the first target sending time period based on the first periodicity comprises:
sending the RS between the first time point and the second time point based on the first periodicity.

4. The method according to claim 1, wherein the RS is a channel state information reference signal (CSI-RS) or a time-frequency tracking signal (TRS).

5. A reference signal transmission method, comprising:
receiving configuration information of a reference signal (RS) from a network device, wherein the configuration information comprises a parameter of at least one periodic target sending time period of the RS;
determining a paging downlink control information (DCI);
determining whether the network device sends the RS in a target sending time period by determining whether the paging DCI comprises first indication information, wherein the first indication information indicates that the network device sends the RS in a first target sending time period, the first target sending time period belongs to the target sending time period; and
receiving the RS if the network device sends the RS in the target sending time period, wherein each of the at least one periodic target sending time period is longer than a first periodicity.

6. The method according to claim 5, wherein the paging DCI is in a first duration at a beginning of the first target sending time period; and
wherein receiving the RS comprises receiving the RS based on the first indication information.

7. The method according to claim 5, wherein the configuration information indicates a first time point and a second time point in the target sending time period, and wherein receiving the RS comprises:
receiving the RS in a time period between the first time point and the second time point.

8. The method according to claim 5, wherein, after receiving the RS, the method further comprises:
performing time-frequency tracking based on the RS.

9. The method according to claim 5, wherein the RS is a channel state information reference signal (CSI-RS) or a time-frequency tracking signal (TRS).

10. An apparatus, comprising:
one or more processors; and
one or more non-transitory computer readable memories coupled to the one or more processors and storing programming to be executed by the one or more processors, the programming including instructions for:
receiving configuration information of a reference signal (RS) from a network device, wherein the configuration information comprises a parameter of at least one periodic target sending time period of the RS;
determining a paging downlink control information (DCI);
determining whether the network device sends the RS in a target sending time period by determining whether the paging DCI comprises first indication information, wherein the first indication information indicates that the network device sends the RS in a first target sending time period, the first target sending time period belongs to the target sending time period; and
receiving the RS if the network device sends the RS in the target sending time period,
wherein each of the at least one periodic target sending time period is longer than a first periodicity.

11. The apparatus according to claim 10, wherein the paging DCI is in a first duration at a beginning of the first target sending time period; and
wherein receiving the RS comprises receiving the RS based on the first indication information.

12. The apparatus according to claim 10, wherein after receiving the RS, the instructions further include instructions for:
performing time-frequency tracking based on the RS.

13. The apparatus according to claim 10, wherein the RS is a channel state information reference signal (CSI-RS) or a time-frequency tracking signal (TRS).

14. An apparatus, comprising:

one or more processors; and one or more non-transitory computer readable memories coupled to the one or more processors and storing programming to be executed by the one or more processors, the programming including instructions for:

sending configuration information of a reference signal (RS) to a terminal device, wherein the configuration information comprises a parameter of at least one periodic target sending time period of the RS;

sending first indication information to the terminal device in paging downlink control information (DCI), wherein the first indication information indicates that a network device sends the RS in a first target sending time period; and sending the RS in the first target sending time period based on a first periodicity, wherein the first target sending time period belongs to the at least one periodic target sending time period, wherein each of the at least one periodic target sending time period is longer than the first periodicity.

15. The apparatus according to claim 14, wherein the paging DCI is in a first duration at a beginning of the first target sending time period.

16. The apparatus according to claim 14, wherein the RS is a channel state information reference signal (CSI-RS) or a time-frequency tracking signal (TRS).

17. The apparatus according to claim 14, wherein the configuration information indicates a first time point and a second time point in the first target sending time period, and wherein sending the RS in the first target sending time period based on the first periodicity comprises:

sending the RS between the first time point and the second time point based on the first periodicity.

* * * * *